United States Patent [19]

Zafiroglu

[11] Patent Number: 5,707,710
[45] Date of Patent: Jan. 13, 1998

[54] COMPOSITE SHEET FOR ARTIFICIAL LEATHER

[75] Inventor: Dimitri Peter Zafiroglu, Wilmington, Del.

[73] Assignee: E. I. Du Pont de Nemours and Company, Wilmington, Del.

[21] Appl. No.: 625,058

[22] Filed: Mar. 29, 1996

[51] Int. Cl.$^6$ .................................................. B32B 9/00
[52] U.S. Cl. ........................ 428/151; 428/152; 428/161; 428/166; 428/172; 428/218; 428/220; 428/233; 428/235; 428/252; 428/284; 428/286; 428/298; 428/301; 428/340; 428/423.1; 428/904
[58] Field of Search ........................ 428/151, 152, 428/161, 166, 172, 230, 234, 252, 286, 287, 904, 218, 219, 220, 233, 235, 284, 297, 298, 301, 340, 423.1

[56] References Cited

U.S. PATENT DOCUMENTS

| | | | |
|---|---|---|---|
| 3,709,764 | 1/1973 | Thomas | 156/177 |
| 5,112,421 | 5/1992 | Honda et al. | 156/148 |
| 5,256,429 | 10/1993 | Honda et al. | 428/225 |
| 5,268,218 | 12/1993 | Zafiroglu | 428/219 |

FOREIGN PATENT DOCUMENTS

WO 94/1523  9/1994  WIPO .................. D04H 1/74

OTHER PUBLICATIONS

Kirk–Othmer Encyclopedia of Chemical Technology, Fourth Edition, John Wiley & Sons, Inc., vol. 15, "Leather–Like Materials"; pp. 177–192, (1995).

Primary Examiner—Patrick Ryan
Assistant Examiner—Abraham Bahta

[57] ABSTRACT

An improved composite sheet suited for use as artificial leather is prepared by treating with an elastomeric resin a fabric having an interior yarn network and an outer layer of well separated fibers that loop in and out of the yarn network. The resin completely or partially impregnates the outer layer.

9 Claims, 7 Drawing Sheets

COMPOSITE SHEET FOR ARTIFICIAL LEATHER

BACKGROUND OF THE INVENTION

1. Field of the Invention

This invention relates to a composite sheet and a process for making the sheet in which a fabric comprising a planar network of yarns and an outer layer that contains separated fibers of textile titre which loop back and forth through the planar yarn network is treated with an elastomeric resin. More particularly, the invention concerns such a composite sheet having a specific combination of characteristics that makes the sheet particularly suited for use as artificial leather.

2. Description of Prior Art

Fabrics that are impregnated or coated with resins, especially polyurethane resin, are known for use in artificial leathers. Kirk-Othmer Encyclopedia of Chemical Technology, Fourth Edition, John Wiley & Sons, Inc., Volume 15, "Leather-like Materials" p. 177–192, (1995) summarizes the development of such materials. The enclyclopedia notes that in the 1930s a plasticized poly(vinylchloride) film coated onto a woven or knitted fabric was developed as a leather-like material, but the material was stiff, exhibited plasticizer migration and had extremely low permeability, poor flex endurance and a cold touch. In the 1960s, synthetic leather materials having improved appearance, feel and resistance to grain break were made by laminating a cast polyurethane film to a brushed fabric. Further improvements in flexibility were achieved with the introduction of poromeric polyurethane-coated fabrics which were produced by applying a solution of a polyurethane resin in an organic solvent to a brushed fabric and then immersing the fabric in a non-solvent bath (e.g., water) to coagulate the polyurethane and form the poromeric structure. Typically, a cast polyurethane film was applied atop the poromeric structure. Polyurethane-impregnated and coated nonwoven fabrics made with ultra-fine fibers or microfibers (i.e., of less than 0.3 den) also were developed to produce suede-like and other leather goods.

Combinations of various woven or knitted fabrics with nonwoven materials also have been disclosed for use in making artificial leather. For example, Honda et at, U.S. Pat. No. 5,256,429, discloses making a composite sheet by needle punching a surface layer of special staple fibers of very low denier into a tightly woven or tightly knit fabric of high twist multifilament yarn and then coating or impregnating the resulting structure with a binder. The special fibers are formed from "islands-in a-sea" composite fibers by dissolving the polymeric "sea" surrounding "islands" of a second polymer to leave fibers of very low titre (i.e., 0.001 to 0.1 den). However, making artificial leather products from "islands-in-a-sea" fibers is costly.

In PCT International Publication No. WO 94/19523, the present inventor disclosed an abrasion-resistant resin-impregnated nonwoven composite sheet. The composite sheet is a resin-impregnated fabric that was formed from a lightweight nonwoven fibrous layer attached to a contracted planar network of yarns, such as a fabric formed by stitch-bonding a fibrous layer with extended elastic yarns under tension and then releasing the tension from the yarns. As a result of the contraction that accompanies the release of the tension from the yarns, the fabric has an outer layer of densely concentrated "pile-like fibers". Typically, the fibrous layer is contracted to less than half its original area, which simultaneously causes groups of fibers to buckle and form inverted U-shaped loops that project from the plane of the layer. Additional means for contracting the fabric can further increase the fabric density and the pile-like fiber concentration. The contracted fabric is impregnated with resin to immobilize the pile-like fibers and to stabilize the fabric. Although such composite sheets are highly abrasion-resistant and suitable for many uses, the sheets are too stiff, incompressible, impermeable and non-absorbent to be useful as a substitute for soft, conformable and pliable leather.

An object of this invention is to provide an economical composite sheet having a combination of softness, resilience, conformability, moisture absorption and other physical properties that make the sheet particularly suited for use as artificial leather.

SUMMARY OF THE INVENTION

The present invention provides an improved composite sheet of the type that comprises a fabric which is treated with an elastomeric resin and has a total thickness in the range of 0.5 to 3.0 millimeters, a unit weight in the range of 200 to 1000 g/m$^2$ and a void content in the range of 60 to 90%, a longitudinal direction, a transverse direction, an upper outer layer, a lower outer layer and a stitched, knitted or woven planar network of yarns located between and parallel to the upper and lower outer layers, the planar network of yarns containing a multiplicity of tie points and having a thickness in the range of one-tenth to one-third of the total thickness of the fabric, and at least the upper or the lower outer layer being in the range of 0.3- to 2.0-mm thick, comprising fibers of 0.5 to 5 decitex that are substantially separated from each other and form loops that pass back and forth through the planar network of yarns, and being treated with the elastomeric resin.

The improvement of the invention comprises, in combination, the composite sheet having an over-all density in the range of 0.2 to 0.45 g/cm$^3$, the fabric having a tie point concentration in the range of 25 to 400 tie points/cm$^2$, with a tie point frequency of no more than 25/cm in each of the longitudinal and transverse directions and the resin-treated outer layer having an effective fiber concentration in the range of in the range of 0.03 to 0.25 g/cm$^3$, an average density of no greater than 0.35 g/cm$^3$ and a layer parameter P of no greater than 0.25 g/cm$^3$.

When used for artificial leather, the resin-treated outer layer of the composite sheet becomes a surface layer of the artificial leather. The composite sheet may also have an optional thin polymeric coating applied atop the resin-treated layer.

Typically, the resin-treated composite sheet has an elastic stretchability of least 15%, preferably at least 20%, in at least the longitudinal or the transverse direction, a compressibility of 10 to 40% which is at least 80% recoverable, a bending length of no greater than 5.5 cm per mm of composite sheet thickness, and a moisture retention in g/m$^2$ of at least 1.25 times the total area weight of the resin impregnated composite fabric. The composite sheet also is strong, typically having a tongue tear strength of at least 2 Kg (preferably at least 5 Kg) in each direction and a tensile strength of at least 5 Kg (preferably at least 10 Kg) in each direction.

In a preferred embodiment of the composite sheet, the resin is a poromeric polyurethane, the yarns in at least one direction of the planar yarn network include spandex elastic yarns or shrinkable yarns of partially oriented polyester or nylon. In another preferred embodiment, at least 30 weight percent of the fibers in the resin-treated outer layer are cellulosic fibers, most preferably rayon fibers.

The invention also provides a process for making a composite sheet. The process comprises, in sequence, the steps of stitchbonding, knitting, or weaving a fabric, preferably with at least one set of contractible yarns, most preferably with bare spandex yarns or elastic combination yarns, to form within the fabric a planar network of yarns having 3 to 20 tie-points per centimeter in each of a longitudinal direction and a transverse direction of the fabric;

contracting the fabric in at least one of the directions to increase the number of tie points per centimeter in at least one direction by at least 20%, preferably at least 25%, to provide a tie-point concentration in the range of 20 to 400 per $cm^2$ and a tie-point frequency in the range of 5 to 25 per cm in each direction, and to cause to be formed in the fabric at least one outer layer having a thickness in the range of 0.3 to 2 mm in which the fibers are bulked and generally separated from each other, the bulked fibers repeatedly looping in and out of the planar network of yarns and being present in the outer layer in an effective concentration in the range of 0.05 to 0.35 $g/cm^3$; and applying an elastomeric resin to the fabric in a quantity sufficient to provide the resin-treated fabric with an over-all density in the range of 0.2 to 0.45 $g/cm^3$ and the outer fibrous layer with an average density of no greater than 0.35 $g/cm^3$ and a layer parameter P of no greater than 0.25 $g/cm^3$.

In preferred embodiments of the process, the fabric is contracted to less than 75% of its original area, the elastomeric resin is a polyurethane resin, the quantity of resin applied to the fabric is in the range of 20 to 45 weight percent of the fabric plus resin, and the planar yarn network is prepared with at least one set of contractible yarns, the contractible yarns being bare spandex yarns or of elastic combination yarns. In still another preferred embodiment, the resin is applied as a solution of polyurethane in an organic solvent and the polyurethane is coagulated by extracting the organic solvent with water, thereby forming a poromeric structure.

BRIEF DESCRIPTION OF THE DRAWINGS

The invention will be better understood by to the drawings in which.

DESCRIPTION OF PREFERRED EMBODIMENTS

Figure 1:
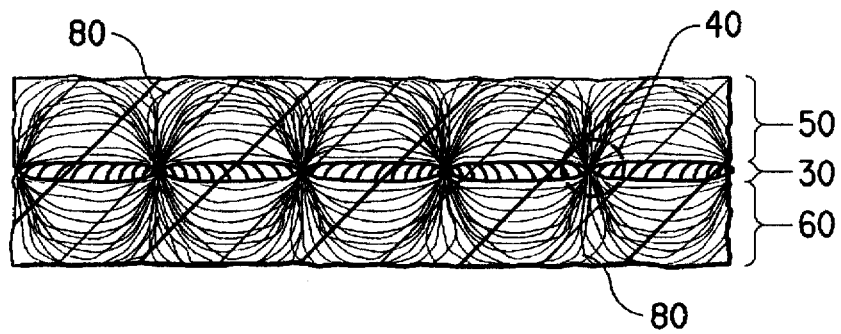
FIGS. 1, 2 and 3 each depict an idealized cross-section of a composite sheet of the invention with FIG. 1 depicting a fabric that is impregnated with elastomeric resin throughout its thickness, FIG. 2 depicting the same fabric with an optional thin polymeric top coating and FIG. 3 depicting a fabric having an outer fibrous layer that is partially impregnated with elastomeric resin and an optional thin polymeric top coating.

The following descriptions of preferred embodiments of the invention are included for the purposes of illustration and are not intended to limit the scope of the invention. The scope is defined by the appended claims.

Several terms used herein are defined as follows. "Spandex" is a generic term for a manufactured fiber in which the fiber-forming substance is a long chain elastomer comprised of at least 85% segmented polyurethane. An "elastomeric resin" is a resin which typically has a Shore A durometer hardness of no greater than about 70, and in the form of a cast film of 0.025 to 0.050 mm thickness, has a break elongation of at least about 125% and a substantially immediate recovery to its original length, or to no more than about 1.3 times its original length, after the film sample is released from a 100% elongation.

The term "combination yarn" means a yarn in which there are at least two dissimilar component yarns. In the present invention the component yarns comprise at least a shrinkable or elastomeric yarn and a conventional non-elastic yarn of natural or synthetic textile fibers. The latter type of fibers is sometimes referred to herein as a "hard" fibers which usually are fully drawn. A "partially oriented yarn", sometimes referred to herein as "POY", is a yarn in which the fibers or filaments are partially molecularly oriented (i.e., not fully drawn). Fibers of "textile titre" typically are in the range of 0.5 to 5 dtex.

"Tie points" within a fabric used to prepare a composite sheet of the invention refer to (a) stitch or yarn insertion points in a stitchbonded fabric, or (b) points at which the loops of stitches in a knit fabric intersect, or (c) points where warp (longitudinal direction) and weft (transverse direction) yarn cross over and under each other in a woven fabric.

The invention will now be explained in further detail with reference to the drawings, in which like reference numerals designate like elements.

Figure 2:
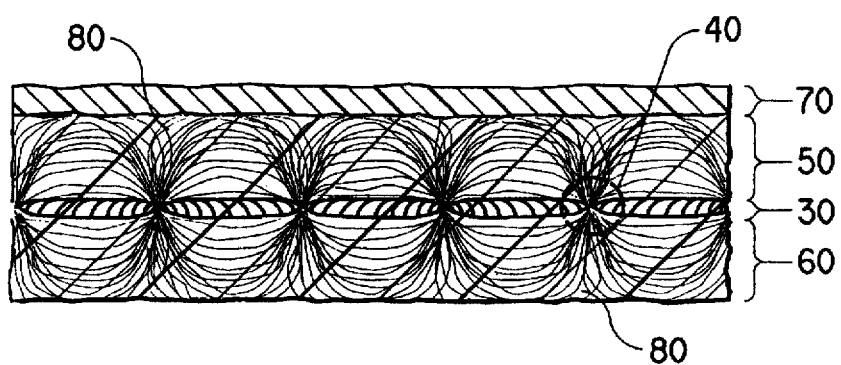
Figure 3:
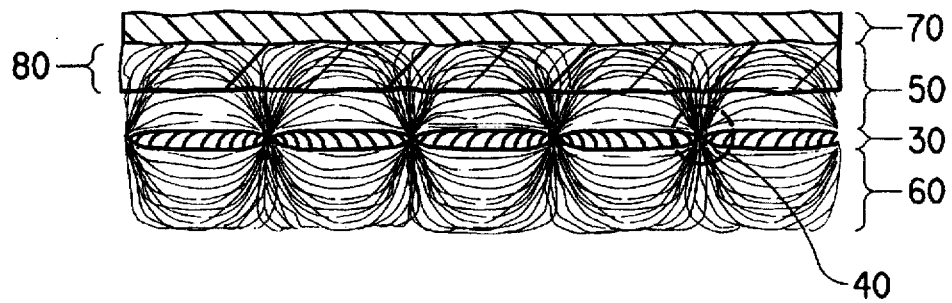

FIGS. 1, 2 and 3 each depict an idealized cross-section of a composite sheet of the invention. FIG. 1 shows the arrangement of the various layers within a composite sheet, made from a fabric which is impregnated with elastomeric resin 80 throughout its entire thickness. The layers include a planar network of yarns 30, located between upper outer fibrous layer 50 and lower outer fibrous layer 60. Yarn network 30 contains many tie-points 40. The resin impregnant is designated 80. FIG. 2 illustrates an optional thin polymeric coating layer 70 atop outer fibrous layer 50. Optional layer 70 can penetrate a short distance into elastomeric-resin impregnated fibrous layer 50, but mainly rests atop layer 50 to provide certain aesthetic characteristics, such as color, texture, etc., to the outer surface of the composite sheet. FIG. 3 represents a composite sheet similar to that of FIG. 2, except that elastomeric resin 80 does not impregnate the entire thickness of fibrous layer 50.

Figure 4:
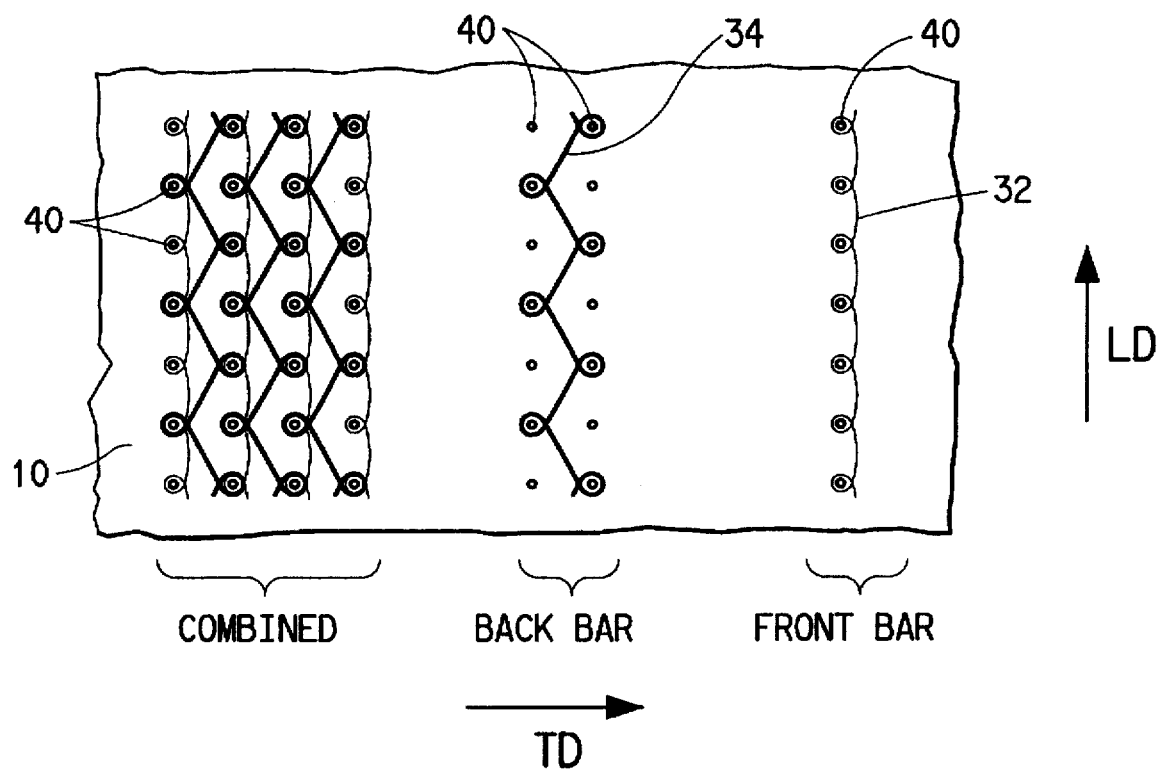
FIG. 4 depicts a typical a two-bar stitch pattern employed with a fibrous layer to form a stitchbonded nonwoven fabric for use in the present invention.

FIG. 4 represents a stitch diagram for a simple two-bar stitch pattern to be used for inserting stitching yarns into a fibrous layer to form a stitchbonded nonwoven fabric that could be resin treated to form a composite sheet in accordance with the invention. For illustration purposes, yarn 32 is shown as (1-0,0-1) chain or pillar stitches being formed by the front bar of a multi-needle stitching machine and yarn 34 is shown as (1-0,1-2) tricot stitches being formed by the back bar of the multi-needle stitching machine. The combined yarns interconnect and form a planar network of yarns, which are designated 30 in subsequent figures. The multiple stitch or yarn insertion points form the tie-points which are designated 40 in subsequent figures. Conventional knitting nomenclature and diagrams were used to prepare the figure. The longitudinal direction (LD) and the transverse direction (TD) of the fabric also are indicated.

Figure 5:
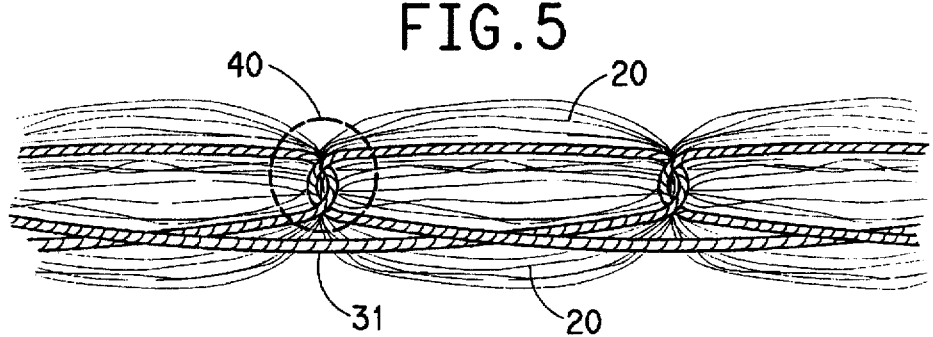
FIGS. 5 and 8 illustrate cross-sections of a stitchbonded fabric before a contraction step and FIGS. 6, 7 and 9 illustrate the cross-sections after contraction and resin-application steps.
Figure 6:
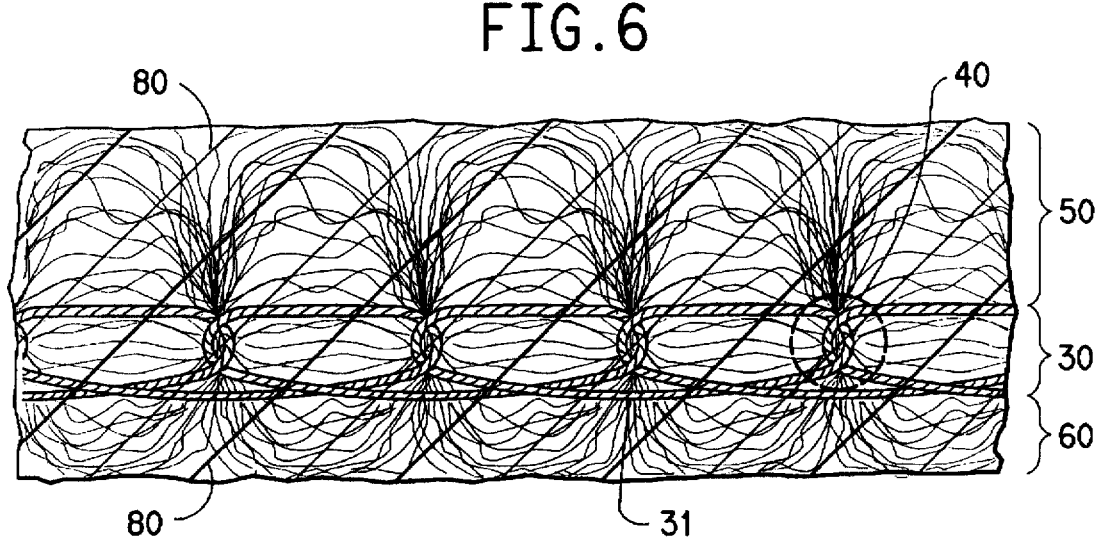
Figure 7:
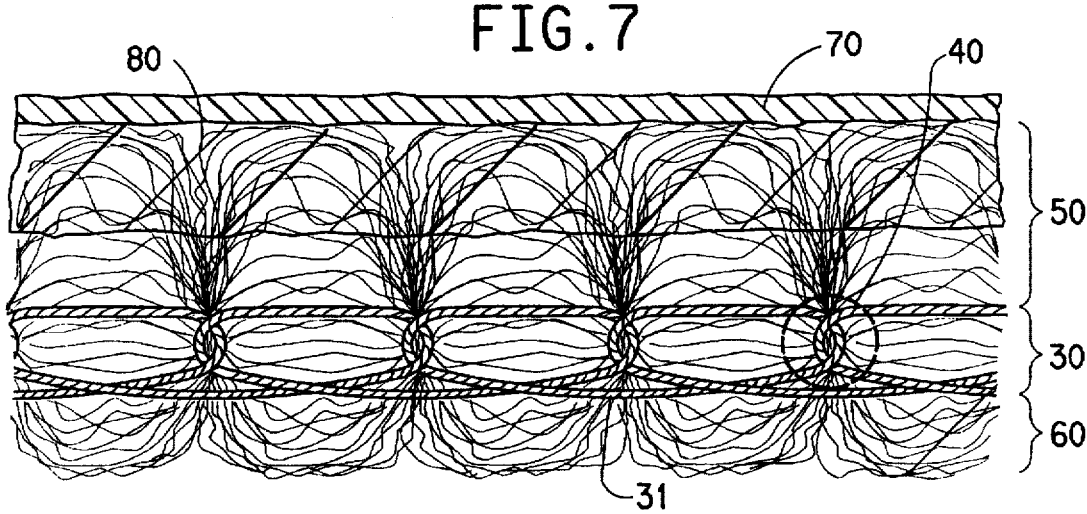

FIGS. 5, 6 and FIG. 7, respectively represent a cross-section taken in the longitudinal direction through a row of stitches in a stitchbonded fabric before a contraction step (FIG. 5) and then after the contraction and a resin application step (FIGS. 6 and 7). These figures illustrate yarn 31 forming planar network 30 and tie points 40. Fibers 20 originated in the nonwoven fibrous layer that was subjected to the stitchbonding operation that was used to produce the fabric. Fibers 20 loop in and out of the planar yarn network 30 and form upper outer layer 50 and lower outer layer 60. FIGS. 6 and 7 are drawn to approximately the same scale as FIG. 5 and show the fiber bulkiness that is developed in the upper and lower outer fibrous layers during the contraction step which imposes a decrease in the distance between tie-points 40. Resin 80 covers the tops of all the fibers in the upper outer fibrous layer. The tops of the fibers refers to the outermost portions of the fibers which extend farthest from planar yarn network 30. Note that in FIG. 6, the fabric is shown as impregnated with elastomeric resin 80 throughout its entire thickness. In FIG. 7, the fabric is shown as impregnated with elastomeric resin 80 through only the upper portion of the outer fibrous layer and that the fabric also has an optional polymeric coating 70 is atop the elastomeric resin containing layer.

Figure 8:
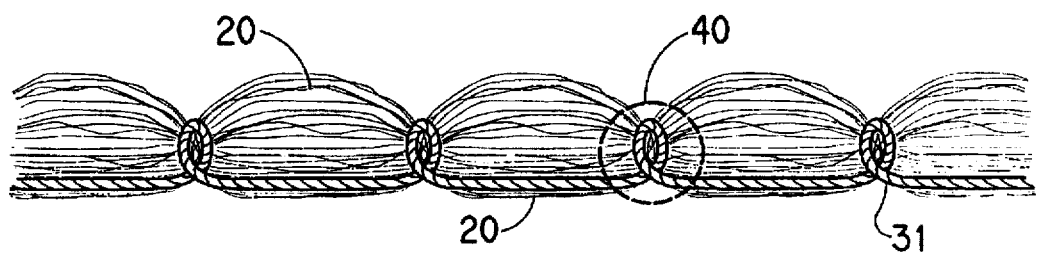
Figure 9:
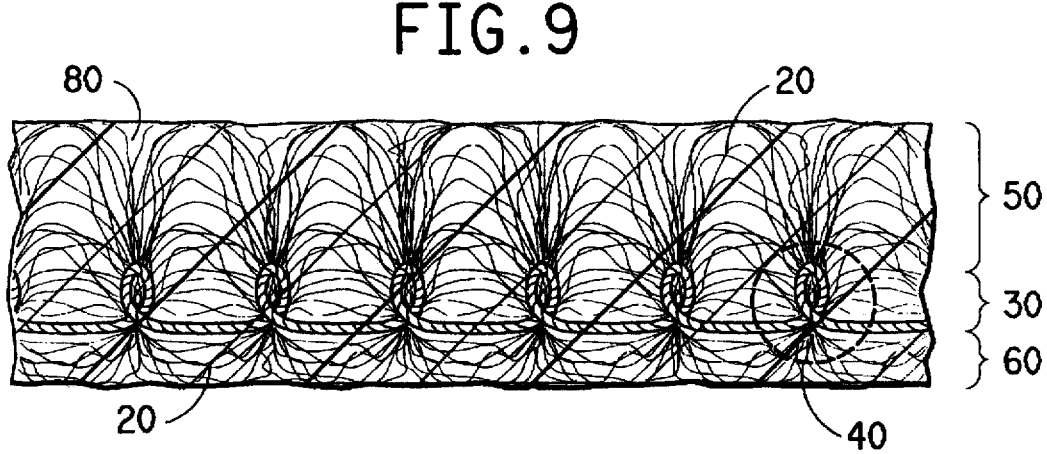

FIG. 8 and FIG. 9, sketched to approximately the same scale, respectively represent a cross-section taken in a direction through a stitchbonded fabric parallel to the underlaps that are between rows of stitches, before and after the contraction and resin-application steps. In FIG. 9, the yarns of planar network 30 are highly contracted and result in a large reduction in the distance between tie points 40, and between the particular stitches illustrated. Note that fibers 20 in upper outer layer 50 are much more highly bulked and provide a much thicker outer layer than in lower outer layer 60. Elastomeric resin 80 impregnates the entire thickness of the fabric.

Figure 10:
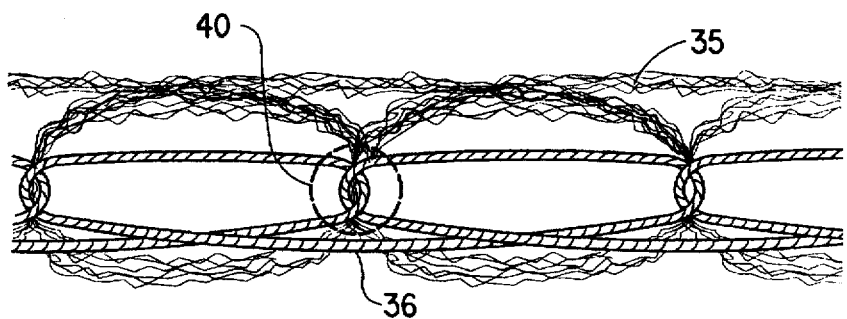
FIGS. 10 and 11, respectively represent a cross section of a knit fabric taken parallel to the stitch underlaps, before and after contraction and resin-application steps and FIGS. 12 and 13 respectively similarly represent a transverse crossection of the knit fabric before and after contraction and resin application steps.
Figure 11:
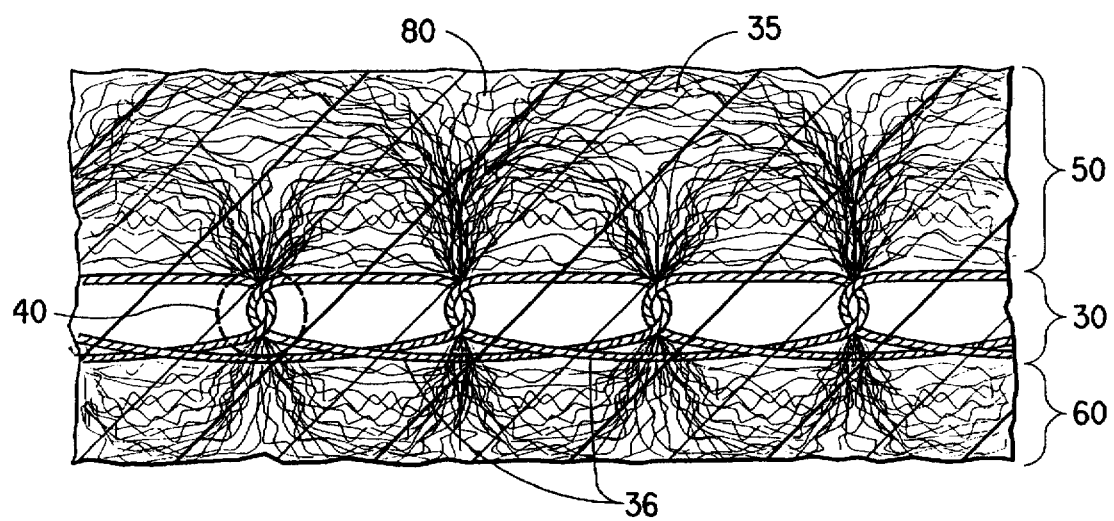
Figure 12:
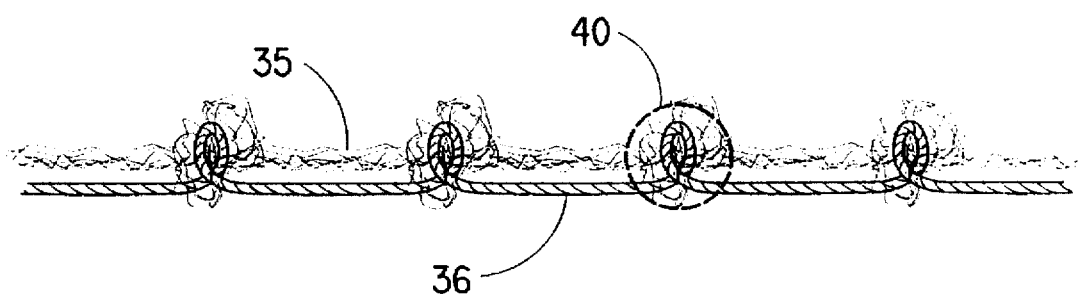
Figure 13:
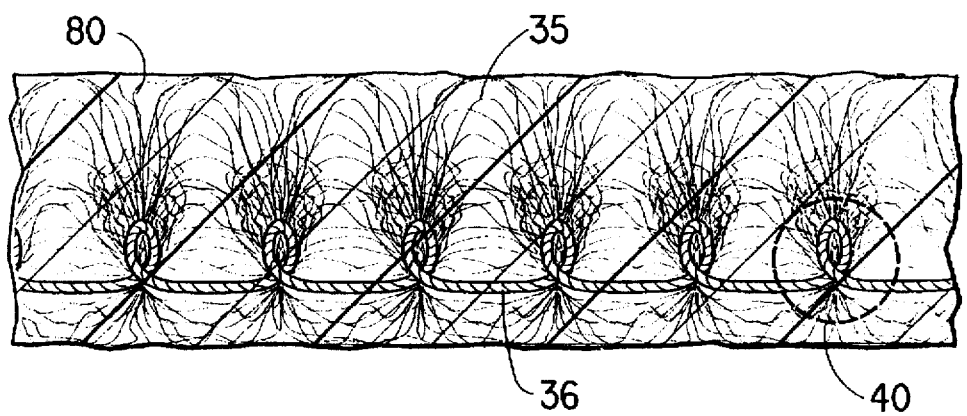

FIGS. 10 and 11, respectively represent a cross section of a knit fabric taken parallel to the underlaps of a series of stitches knit with bulkable yarn 35 and contractible yarns 36, before and after the contraction and resin-application steps. Bulkable yarn 35 can buckle in single, double or multiple nodes, depending on the particular stitch pattern employed. FIGS. 12 and 13 respectively represent a cross section of a knit fabric taken through a series of stitches approximately transverse to the view of FIGS. 10 and 11, before and after the contraction and resin application steps.

Figure 14:
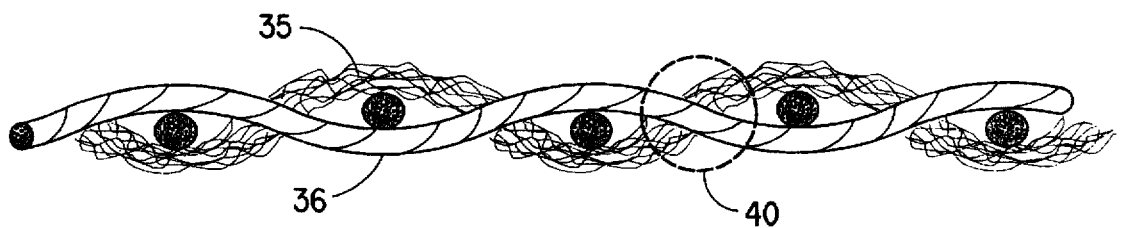
FIGS. 14 and 15 respectively represent a crossection of a woven fabric before and after contraction and resin application steps.
Figure 15:
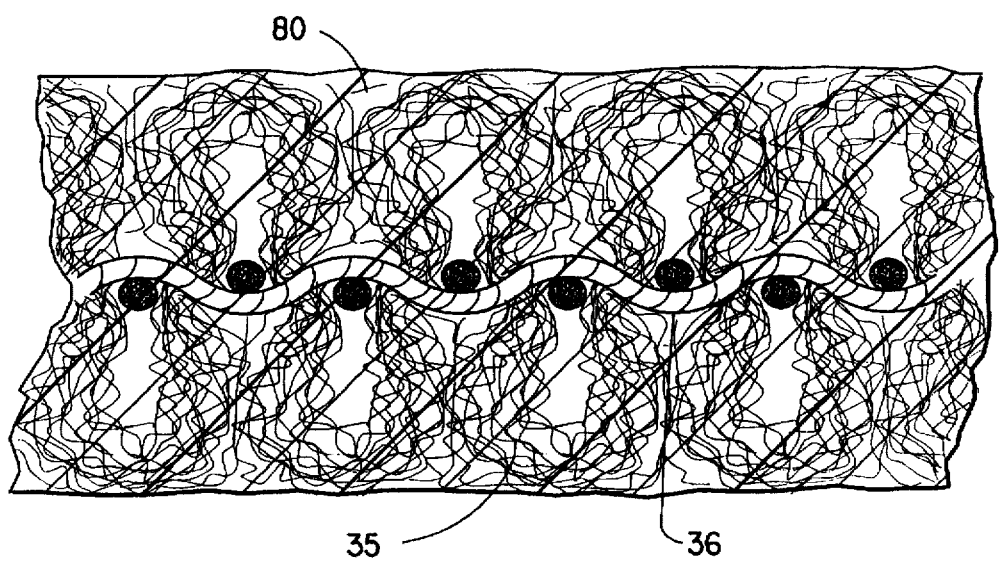

FIGS. 14 and 15 respectively represent, before and after the contraction and resin application steps, a cross section of a woven fabric taken through a line of warp/weft cross-overs (i.e., tie-points), the fabric having been woven with bulkable yarns 35 and contractible yarns 36.

The invention provides a strong, tear-resistant, durable, soft, and flexible composite sheet suitable for use as artificial leather. In accordance with the invention, the composite sheet comprises a fabric that is treated with an elastomeric resin through at least one surface of the fabric. The fabric has a particular combination of structural features, described hereinafter. The resin preferably is a polyurethane elastomeric resin that typically constitutes 10 to 70%, more usually 20 to 45%, of the total weight of the composite sheet. Typically, the composite sheet has a unit weight in the range of 200 to 1,000 $g/m^2$, a total thickness in the range of 0.5 to 3.0 mm and an over-all density in the range of 0.2 to 0.45 $g/cm^3$.

The fabric used for preparing the composite sheet of the invention can be a stitchbonded fabric, a knit fabric or a woven fabric. The fabric is then subjected to a contraction step to provide the fabric with the specific combination of structural features required for the creation of satisfactory artificial leather. The fabric is stitchbonded, knit or woven to create an upper and a lower outer layer of fibers between which a coarse planar network of yarns is located. In stitchbonded fabrics for use in the invention, the fibers of the outer layers originate from the stitched fibrous layer, and from bulkable yarns when the stitching includes such yarns. In knit and woven fabrics suitable for use in preparing composite sheets of the invention, the fibers of the outer layers originate from the bulkable yarns from which the fabrics were knit or woven. The fibers of the outer layers are of textile titre and are generally well-separated from each other. By generally well-separated from each other is meant that the fibers do not make side-by-side linear or spiral contact with each other for any appreciable length. Instead, the fibers diverge and cross each other. Whenever a stitch-bonded fabric is used to prepare the composite sheet, the starting nonwoven fibrous layer that is multi-needle stitched, is a well opened, nonbonded web of staple fibers or continuous filaments. Such webs, upon contraction of the stitching result in well-opened and separated fibers in the outer fibrous layers of the composite sheet. When bulkable yarn is used to make a stitchbonded, knit or woven fabric for use in a composite of the invention, the bulkable yarn is typically a textured yarn or loosely entangled combination yarn. Such bulkable yarns, upon being contracted "bloom" out and provide well separated fibers for the outer layers of the fabric. Fabrics formed by mechanically needling fibers into a scrim or non-bulked fabrics such as velours, terry cloths, and the like are not suited for use as fabrics that can be resin-treated to form composite sheets of the invention.

At least the upper or the lower outer layer has a thickness in the range of 0.3 to 2 mm and an effective fiber concentration in the range of 0.05 to 0.35 $g/cm^3$. The fibers of the outer layer describe paths that repeatedly loop back and forth through the planar network of yarns at large angles (e.g., 40 to 90 degrees) to the plane of the network.

In contrast to the fine, well-separated fibers of the outer layers of the fabrics used to prepare the composite sheets of the present invention, the planar yarn networks of the fabrics are rather dense and coarse. The planar network of yarns constitutes about one-tenth to one-third of the total thickness of the fabric and also of the final thickness of the resin-treated composite sheet. The planar network is formed from the contracted yarns used to stitch, knit or weave the fabric and the contracted yarns remain in the plane of the network. Typical contractible yarns suited for use in the fabrics of the composite sheet of the invention include tensioned elastic yarns, partially oriented contractible yarns, and the like. Examples of yarns that remain within the planar network include flat or textured yarns that were heat set under tension, covered yarns having tight wrap yarns, and the like.

To achieve satisfactory performance of the final resin-treated fabric in the composite sheet, the number of tie points per unit area and the tie-point frequency in the longitudinal and transverse directions within the planar network of yarns are within certain required ranges. To achieve the required ranges for the tie points, the spacing between tie points is adjusted (e.g., usually decreased by at least 20% in at least one direction) so that there are no more than 25 tie points per cm (preferably 5 to 20 per cm) in the longitudinal and transverse directions of the fabric and in the range of 25 to 400 tie points per cm$^2$ (preferably 50 to 250 per cm$^2$). The network of yarns constitutes one-tenth to one-third of the total thickness of the composite sheet.

In accordance with the invention, the composite sheet includes an elastomeric resin which typically is applied to and/or through the surface of the an outer fibrous layer of the contracted fabric. The elastomeric resin can partially penetrate the fabric to a minor depth, or can impregnate the entire fabric or can rest mainly on the surface of the outer layer of the fabric.

When the effective fiber concentration in the outer layer is relatively high (e.g., at least 0.25 g/cm$^3$) most of the desired properties for artificial leather, except perhaps for the surface appearance and feel, are contributed by the fabric itself. With such fabrics, the elastomeric resin needs to impregnate the outer layer to a depth of as little as 0.3 mm. However, if there is a thin polymeric coating atop the resin-treated outer fibrous layer, the depth of impregnation of the elastomeric resin into the outer layer need be only about 0.1 mm. With such relatively dense outer layers of the fabric, the small depth of such elastomeric resin impregnation and polymeric top-coating apparently is sufficient to maintain the integrity of the resin-treated outer layer and to prevent surface cracking when the composite sheet is bent or folded. When the fiber concentration in the outer layer is relatively low (e.g., less than 0.20 g/cm$^3$), greater penetration of the elastomeric resin into the fabric is usually needed to provide the desired properties to the composite sheet. For fabrics that have low fiber concentrations in the outer layer, resin impregnation of the entire thickness of the outer layer (or even of the entire fabric) is preferred for making composite sheet having the properties desired for artificial leather.

To assure achievement of the desired properties in the composite of the invention, in addition to the careful preparation of the appropriate fabrics for resin treatment, the particular resin must be elastomeric and have an elastic stretch of at least 125%, preferably of at least 200%, a Shore A hardness of no greater than 70, preferably no greater than 60, and the ability to recover almost immediately to its original length after release from a stretch of 100%. Preferably, the elastomeric resin is a polyurethane elastomer, most preferably a poromeric polyurethane elastomer. Further, to assure achievement of the desired properties in the final composite, the outer fibrous layer has an effective fiber concentration in the range of 0.03 to 0.25 g/cm$^3$, an average density in the range of 0.15 to 0.35 g/cm$^3$, and a layer parameter P of no greater than 0.25 g/cm$^3$.

The above-described resin, fabric and composite sheet characteristics assure that the composite sheet of the invention will be well suited for use as artificial leather. More specifically, the resin-impregnated composite sheet of the invention typically possesses, in combination, a maximum bending length of no greater than 5 cm per mm of composite sheet thickness, a compressibility in the range of 10 to 40% which is at least 80% recovered upon removal of the compressive load, and a water retention per unit area that amounts to at least 1.2 times the weight per unit area of the composite sheet. A typical composite sheet of the invention also has a stretchability of at least 15% (usually greater than 20%) in at least the longitudinal, transverse or diagonal direction of the sheet, a ship tensile strength of at least 5 Kg in the longitudinal or transverse direction and a tongue tear strength of at least 2 Kg in the longitudinal or transverse direction of the sheet. The test methods by which these various composite sheet properties are measured are described hereinafter.

The process for making a satisfactory composite sheet of the invention comprises preparing a particular fabric having a certain combination of characteristics and then resin-treating the fabric in a specific manner.

Fabric for use in preparing composite sheets of the invention can be produced in several ways. For example, particular stitchbonding, knitting or weaving procedures are suitable.

In the stitchbonding procedure, yarns are multi-needle stitched into a nonwoven layer of well separated fibers of textile titre. The stitching yarn forms the planar network of yarns with multiple tie points and the textile-titre fibers of the nonwoven layer form the upper and lower fibrous outer layers. The nonwoven layer employed in the stitchbonding is a substantially nonbonded, open nonwoven fibrous layer. Lightly spunlaced or lightly mechanically-needled layers of crimped fibers are particularly useful for the starting nonwoven layer. The nonwoven layer is caused layer to buckle above and below the plane of the nonwoven starting layer by (a) being over-fed to the multi-needle stitching machine and/or (b) by contracting or shrinking the stitching yarns inserted into the nonwoven fibrous layer by the stitchbonding machine. In contrast, a dense, layered nonwoven fibrous starting layer, such as a flat nonwoven sheet of non-crimped filaments, a well-bonded fiber sheet, or a spunbonded sheet, when buckled, can form a thin, dense "corrugated" sheet, but such corrugated sheets are not suited for use in the present invention.

The stitching yarn that forms the planar yarn network in the fabric to be resin-treated in accordance with the invention can be flat shrinkable yarn, contractible elastomeric yarn, contractible partially oriented yarn, spandex yarn, contractible combination yarn or the like. In the multi-needle stitching of a substantially nonbonded bulky layer of s well separated fibers of textile titre, the stitching yarn forms the planar yarn network with its multiple tie points and causes the bulky fibers to loop in and out of the network.

The desired fabric intended for resin treatment in accordance with the invention can also be formed by particular knitting and weaving techniques. Various combinations of bulkable or bulked yarns and non-bulkable or hard yarns can be used for the wales and courses of a knit fabric and for the warps and/or wefts of a woven fabric. Bulkable yarns are yarns that can buckle randomly out of plane when subjected to a contraction or shrinkage treatment. Preferably, the yarns are textured yarns. The bulkable yarns can originate from separate warp or weft yarns in a woven fabric, or from bulkable composite yarns. The bulkable composite yarns are formed by loosely combining a hard or non-bulkable yarn with a bulkable yarn by conventional techniques such as air-jet entangling the yarns or loosely twisting the yarns together (e.g., at fewer than two turns per cm). A most preferred composite yarn has a textured hard yarn combined with a spandex elastic yarn.

A preferred desired fabric for use in the process of the invention, has cellulosic fibers in at least the fibrous outer layers of the fabric. The cellulosic fibers (e.g., rayon fibers) can be included readily provided in the fibrous nonwoven layer in a stitchbonded fabric or in the fibers that become bulked in composite bulkable yarns, or as separate bulkable yarns. Cellulosic fibers provide superior moisture absorption and transport along and within the fabric (and final composite sheet). The superior moisture absorption and transport lead to superior "dry comfort" in articles of artificial leather.

To adjust the final concentration of tie-points per unit area and the frequency of tie-points in one or more directions of the fabric, the fabric is subjected to a contraction in at least one direction, which also decreases the tie-point spacing and the area of the fabric. The decrease in fabric area is accompanied by an increase in the bulk of at least one of the two outer fibrous layers. Among the methods of decreasing the fabric area are (a) elongating a fabric in one direction to effect an even greater decrease in a direction perpendicular to the direction of elongation, (b) forming the fabric with bare or composite elastic yarn under tension and extension and then releasing the tension in the yarns, (c) releasing from tension a fabric that was knitted with bulkable composite elastic yarns under tension, and (d) activating the shrinkage or contraction of yarns in a fabric that was woven or knit with a combination of shrinkable or contractible yarns and bulkable hard yarns. Several illustrations of these methods of decreasing the area of a fabric and increasing the bulk of the outer fibrous layers in accordance with the invention are given in the Examples below. In all of the contraction methods the buckling and bulking of a nonwoven fibrous layer or of opened yarns that become the upper and lower outer layers of the fabric occur between the tie points of the fabric. The amount of contraction imposed upon the starting fabric is adjusted to provide the fabric with the desired concentration and frequency of tie points and with a bulky outer fibrous layer that has a thickness in the range of 0.3 to 2 mm and an effective fiber concentration within the outer layer in the range of 0.05 to 0.35 g/cm$^3$.

After the starting fabric has been contracted, resin is applied to the fabric. The resin is an elastomeric resin, preferably, a polyurethane elastomer resin, which can be applied as a solution, dry or as ingredients (e.g., a polyol and a polyisocyanate) that form the resin in situ. In another preferred resin-application step, a solution of the resin in an organic solvent is applied through the surface of the fabric and then the solvent extracted with water from the solution, thereby allowing the resin to coagulate and form a poromeric structure. The quantity of resin applied to the fabric is controlled to provide the resultant composite sheet with an over-all density in the range of 0.2 to 0.45 g/cm$^3$ and the outer layer with an average density of no greater than 0.35 g/cm$^3$ (and usually of at least 0.15 g/cm$^3$) and a layer parameter P, (determined as described hereinafter) of no greater than 0.25 g/era$^3$ and preferably no less than 0.1 g/era$^3$.

Although a substantially uniform distribution of the elastomeric resin in the outer layer is preferred, such a uniform distribution is not required. Within the 0.5- to 2-mm thick outer fibrous layer, the resin applied through the outer surface of the layer can be concentrated mainly next to the surface, as long as the average density within the whole outer layer is in the range of 0.15 to 0.35 g/cm$^3$ and the layer parameter P is in the range of 0.1 to 0.25 g/cm$^3$.

Optionally, an additional thin polymeric coating, preferably of polyurethane, can be present on the surface of the composite sheet. The thin coating can be applied separately as an additional coating layer or can be applied as an excess of the resin used in the resin-treated fabric. When present, the coating typically is no thicker than 0.2 mm and usually penetrates into the resin-treated outer fibrous layer about 0.1 mm or so. Thus, the optional coating extends above and beyond the fiber tips or loops of the outer fibrous layer and provides a fiber-free surface atop the resin-treated fibrous outer layer. The optional coating does not detrimentally affect any of the properties reported herein for the composite sheet. However, the optional coating can be used to provide color and texture to the composite sheet surface.

The composite sheets of the invention can be treated further, by conventional techniques to provide a suede-like surface. For such suede-like artificial leather, a composite sheet that has a fully impregnated outer layer and no top coating is preferred. Composite sheets with the optional top coating are suitable for direct use as an outer surface layer of an artificial leather article.

Test Methods

The following methods and procedures are used to measure various characteristics oft he resin-treated composite sheets of the invention. Any optional top-coating on the composite sheet is removed before any of the characteristics are measured.

The weight per unit area of a composite sheet of the invention or of a fibrous layer or fabric from which the composite sheet is produced is measured according to ASTM Method D 3776-79. The density of a resin-treated fabric is determined from its unit weight and its measured thickness. The void fraction of a layer is determined from the measurements of the over-all density of the layer and the weights and densities of the fiber and resin in the composite sheet or in a layer thereof.

The thickness of a composite sheet or a fabric from which the composite sheet is produced is measured with a "touch" micrometer having a ¼-inch (0.64-cm) diameter flat cylindrical probe which applies a 10-gram load to the contacted surface.

The percent of the total thickness of the composite sheet that constitutes the planar network of yarns can be determined by either of two methods. In the first method, the following successive steps are taken: (a) the total thickness, $Z_o$, of the composite sheet is measured; (b) the upper and lower outer fibrous layers of the composite sheet are abraded with 320-grit sandpaper to remove sufficient material to expose the surface of the planar network of yarns is reached; (c) the thickness, $Z_t$, of the sheet without the outer layers (i.e., the thickness of the planar network of yarns) is measured; and (d) the percentage of the total sheet thickness that is the thickness of the planar yarn network is calculated by the formula % $Z_t=100\ Z_t/Z_o$. In the second method, the thickness of the yarn network is determined from magnified (e.g., 15–20X) photomicrographs of cross-sections of the composite sheet taken perpendicular to the plane of the yarn network.

The number of tie points per centimeter in a longitudinal direction or in a transverse direction or the number of tie points in a given area are readily determined by counting such tie points, as viewed under a magnifying glass. The counting can be done at various stages during the manufacture of the composite sheet before resin impregnation. Alternatively, the tie points can be counted after resin impregnation by sanding or abrading off an outer layer of the resin-impregnated composite sheet until the tie points are visible under the magnifying glass.

As used herein, the term "effective fiber concentration" in an outer fibrous layer of the composite sheet refers to the concentration of fibers within the layer which are in the form of buckled loops that are positioned above and/or below the plane of the yarn network. For fabrics in which the fibers of the outer layer originate from buckled, textured, hard-fiber yarns (e.g., as in a contracted knit fabric) the effective fiber concentration is the weight of the textured hard fiber yarns in a given unit area of the layer divided by the thickness of the layer. Similarly, if the fibers in the outer layer are provided by buckled yarns that had been loosely wrapped around a stretched elastic yarn that had then been permitted to contract, the total weight of the wrapping yarns is included in calculating the effective fiber concentration, but the weight of the elastic core is not included. In a composite sheet formed from a contracted-and-buckled nonwoven fibrous layer, the fibers of the outer fibrous layer form loops which, on the average, extend at a small angle from the planar yarn network. For these types of structures, only 50% of the weight of the nonwoven fibrous layer is included in the calculation of the effective fiber concentration. Thus, the effective fiber concentration in g/cm³, $C_{ef}$, in the layer is calculated by the formula, $C_{ef}=10^{-4}$ kw/t. In the formula, k is 0.5 for the fibers that originate from a buckled nonwoven and are generally at a small angle to the yarn network and 1.0 for fibers that are provided by buckled yarns; w is the unit weight of the fibers in grams per square meter; and t is the thickness of the outer fibrous layer in centimeters. The present inventor found empirically, that when the effective fiber concentration of the resin-treated outer layer, calculated in this manner, is in the range required by the invention, a composite sheet having the features desired for artificial leather can be obtained (as long as the other requirements of the invention also are fulfilled).

The average density, $d_t$, of the resin-containing outer fibrous layer, is calculated from the thickness and total weight of the layer. The weight of the layer (i.e., resin and fiber) is determined by measuring the differences in the thickness and the weight of the composite fabric before and after the removal of the resin-treated outer layer by sanding or abrading.

The resin-containing outer fibrous layer is also characterized by a layer parameter, P. The present inventor had found that the P parameter conveniently distinguished among the various abrasion-resistant composite sheets intended for use as artificial leather. The parameter P is calculated from $C_{ef}$, the effective fiber concentration in the outer layer and $d_t$, the average density of the impregnated layer by the formula, $P=[(C_{ef})(d_t)]^{1/2}$. Stiff abrasion-resistant sheets typically have a parameter P of 0.30 g/cm³ or greater. In contrast, composite sheets of the present invention typically have P parameters of less than 0.25 g/cm³, usually in the range of 0.10 to 0.20 g/cm³.

The following additional tests are used for measuring various performance characteristics of the composite sheet samples prepared in accordance with the examples.

The stiffness or flexibility of a composite sheet is measured in accordance with ASTM-1388-64, option A, in the longitudinal, transverse and diagonal (i.e., 45 degrees to the longitudinal and transverse) directions of the composite sheet. The measurements in the two directions that have the lower bending lengths are averaged and reported herein as the "flexibility" of the composite sheet in cm of overhang per mm of composite sheet thickness.

Tongue tear strength and strip tensile strength are each measured in the longitudinal and transverse directions of the composite sheet on 2-cm wide samples by ASTM Test Method D 2261-83 and ASTM Test Method D-5035-90, respectively. The strengths are reported in Kg for each direction.

Stretchability, S, is determined by: (a) cutting specimens measuring 2-cm wide by 10-cm long sample from the composite sheet in the longitudinal direction (LD), in the transverse direction (TD) and in a direction diagonal direction (DD) 45 degrees to the other two directions; (b) marking a standard length, $L_o$, on the specimen parallel to the long dimension; (c) suspending a 1.0-kilogram weight from specimen for 2 minutes; (d) with the weight suspended, re-measuring the "standard length", the re-measured length being designated $L_f$; and (e) calculating the percent stretchability, % S, by the formula, % $S=100\ (L_f-L_o)/L_o$. The highest of the LD, TD or DD % stretch is reported herein as the stretchability of the composite sheet. The low-stress employed in this stretchability test simulates the stresses that occur when leather is handled, bent or draped. Also, it is believed that a stretchability of at least 15% and preferably at least 20%, or even much higher, leads to composite sheets of the invention that have a superior resistance to failure from repeated flexing.

Compressibility, C, is determined by measuring the thickness of the composite sheet (a) under no pressure, $t_o$, and (b) under a pressure of 70 kiloPascals (10.2 lb/in²), $t_t$. A thickness gage is employed which imparts a 2.5-pound (1.14-Kg) load to the surface of the composite sheet through a cylindrical foot of ¼-inch (0.64-cm) diameter. Then, the percent compressibility, % C, is calculated by the formula, % $C=100\ (t_o-t_t)/t_o$. The ability of the composite sheet to recover from compression is expressed as a percent compression recovery, % CR, and is determined by measuring the thickness $t_f$ of the composite sheet within thirty seconds after removing the 70 kPa pressure employed in the compressibility test, sheet and calculating the recovery by the formula, % $CR=100-100(t_f/t_o)$. This low compression compressibility test simulates a typical compression that leather undergoes in handling.

The ability of the composite sheet to transport and retain water, referred to herein as "water retention", WR, is determined by (a) cutting a 5-cm-by-5-cm sample of composite sheet, (b) measuring the sample weight, $W_o$, (c) placing the sample in a tray filled with water and and running a roller over the sample surface to force air out of the sample, (d) allowing the sample to remain in the water for ten minutes, (e) removing the sample from the water, (f) placing the sample on a coarse horizontal screen and allowing the sample to drain for one minute, and (f) determining the weight of the drained sample, $W_f$. The water retention is expressed as a percentage of the weight of the composite sheet and is calculated as, $WR=100\ W_f/W_o$. For each sample, the results of five tests are averaged. This test simulates the capability of leather to hold moisture (e.g., perspiration) in a shoe.

Over-feed ratio and contraction ratio are process parameters reported herein. The over-feed ratio, which applies only to the embodiments of the invention which employ a buckled nonwoven fibrous layer, is defined as the ratio of the initial area of a starting fibrous nonwoven layer to the area oft he layer immediately up-stream of a first processing step (e.g., a stitchbonding step). Over-feed causes buckling, gathering or compression of the nonwoven layer in the direction in which it is being fed to the operation. The contraction ratio is a measure of the amount of further contraction the nonwoven layer undergoes as a result of the specific contraction step to which it is subjected. The contraction ratio is defined as the area of a fabric as it enters a specific operation divided by the area of the fibrous layer as it leaves the operation.

Typical resin-treated composite sheets of the invention have the following desired combination of performance characteristics:

| | |
|---|---|
| Compressibility, % C | 10-40% |
| Recovery from compression, % CR | at least 80% |
| Stretchability, % S | at least 15% |
| Flexibility (bending length) | 5 cm/mm thickness, or less |
| Tongue tear strength | at least 2 Kg |
| Tensile strength | at least 5 Kg |
| Water retention, % WR | at least 125% |

As shown in the Examples below, composite sheets outside the invention (comparison samples) lack one or more of the above-listed performance characteristics and/or the contracted fabric construction required for the composite sheets of the invention. Note that the above-described performance characteristics are also possessed by some of the highest quality artificial leathers on the market today, such as "Ultrasuede", which is made by Kuraray Co., Ltd. of Japan, made by a relatively expensive process involving microfibers formed from islands-in-a-sea composite fibers.

EXAMPLES

Fabrication of various composite sheets is described. Composite sheets of the invention are compared to similar composite sheets that are outside the invention. Samples of the invention are designated with Arabic numerals and comparison samples with upper case letters. In the examples, conventional warp-knitting nomenclature is used to describe the particular repeating stitch patterns that were employed to prepare the various knit or stitchbonded fabrics that were used. All weight percents, unless indicated otherwise, are based on the total weight of the composite sheet (i.e., the weight of the resin and fibers in the resin-treated fabric). Fabrication details and structural and performance characteristics of each composite sheet are summarized in tables accompanying the examples.

In some of the examples, elastic yarns were used to prepare some of the fabrics that were subsequently resin treated. Unless otherwise noted, each fabric made with elastic yarn, after removal from the fabric-forming machine, was (a) allowed to achieve an initial contraction, (b) immersed in boiling water (100° C.) for 1–2 minutes, (c) dried and then (d) heat set on a tenter frame for 1 to 1.5 minutes at 380° F. (193° C). The particular amount of dimensional change imposed LD and TD during the heat setting was used to adjust the amount of contraction in the fabric that was to be resin treated.

Various types of fabrics are employed in the examples to prepare composite sheets. Detailed descriptions of the fabrics are given in each example, but for convenience of identification in the summary tables, the fabrics, prior to resin treatment, are designated as indicated in the following list:

F-1, a spunlaced fibrous sheet stitchbonded with inelastic yarns and then shrunken in boiling water, gathered and heat-set F-2, a spunlaced fibrous sheet stitchbonded with elastic yarns and then shrunken in boiling water, gathered and heat set.

F-3, a fabric knitted with elastic yarns and then shrunken in boiling water, gathered and heat set.

F-4, a fabric woven with elastic spandex yarns in the warp and then shrunken in boiling water, gathered and heat set.

F-5, a spunlaced fibrous sheet that is not gathered, intended for making a comparison composite sheet.

F-6, a brushed woven cotton fabric, intended for making a comparison composite sheet.

F-7, an elastic brushed woven cotton fabric, intended for making a comparison composite sheet.

The fabrics used for preparing the various composite sheet samples of the invention were treated with one of four elastomeric resins. A fifth resin (R-5), included for comparison purposes, was found to be unsuited for making composite sheets intended for soft, flexible artificial leather. The Shore A hardness, % break elongation and % recovery from a 100% stretch of each resin were measured on a 7-inch long by 1-inch wide by 0.1 to 0.2-inch thick (17.8 cm by 2.5 cm by 0.25 to 0.51 cm) cast film of the resin and are summarized as follows:

| Resin | Shore A Hardness | % Break Elongation | % Stretch Recovery |
|---|---|---|---|
| R-1 | 60 | 153 | 100 |
| R-2 | 50 | 360 | 100 |
| R-3 | 55 | 650 | 100 |
| R-4 | 60 | 650 | 100 |
| R-5 | 80 | 10 | 0 |

Resin R-1, QC-4191, available from K. J. Quinn & Co. of Seabrook, N.H. is a two-part polyurethane resin system, comprising three parts polyol per part isocyanate. Unless noted otherwise, when used to treat a fabric, R-1 was mixed at 60° C., brushed onto the fabric sample and then cured.

Resin R-2 is a solution of a polyurethane in dimethylformamide solvent. When used to treat a fabric, the fabric sample was dipped into the solution and then the solvent was extracted from the resin-treated sample with water while the polyurethane coagulated and formed a poromeric structure.

Resin R-3, Bayer 638512, sold by Bayer AG of Germany, is a two-part polyurethane resin composition that was brushed onto a fabric and then cured.

Resin R-4, is resin R-3 dissolved in dimethylformamide and was applied to fabrics in the same way as resin R-2 to form a poromeric structure.

Comparison resin R-5, "ZAR", is a clear polyurethane finish sold by United Gilsonite Laboratories of Scranton, Pa.

Fabrics treated with resin R-1, R-2, R-3 or R-4 were dried and cured in an oven at a temperature of about 65° C. Fabric treated resin R-5, was smoothed with a doctor blade and then dried and cured at room temperature for about two days.

EXAMPLE I

This example illustrates the preparation of a composite sheet of the invention, Sample 1, and compares it with comparison composite sheets outside the invention, Samples A, B and C. All fabrics in this example were impregnated with the same poromeric-structure-forming resin R-2. Sample 1 was prepared from a non-bonded spunlaced fibrous sheet that was stitchbonded with inelastic yarn and contracted to form a fabric of type F-1, which was then impregnated with elastomeric polyurethane solution (R-2) to provide a composite sheet of the invention. The fabric of comparison Sample A was identical to the fabric of Sample 1, but was impregnated with a larger amount of the resin. The fabric for comparison Sample B was a spunlaced sample that was not stitched or contracted and the fabric for Sample C was a brushed, woven cotton fabric of the type often used for preparing commercial artificial leather.

The starting material for Sample 1 and comparison Sample A was SONTARA® Style 8423 spunlaced sheet sold by E. I. du Pont de Nemours & Co. The spunlaced sheet weighed 2.3 oz/yd$^2$ (80 g/m$^2$) and comprised 70% by weight of 1.7-den (1.9-dtex) rayon fibers and 30% of 1.35-den (1.5-dtex) polyester fibers, the fibers being of ⅞-inch (2.2-cm) length. The spunlaced starting sheet was overfed by about 25% to a two-bar 14-gage multi-needle stitching machine that had 14 needles per inch (5.5/cm) in the transverse direction and inserted 22 stitches per inch (8.7/cm) in the longitudinal direction. Textured 70-den (78-dtex) 34-filament polyester yarns were employed on both bars. The front bar inserted 1-0,0-1 chain stitches and the back bar inserted 3-4, 1-0 tricot stitches. The stitched fabric was then subjected to a shrinkage treatment by being immersed in boiling water. Thereafter, the stitched sheet was stretched longitudinally by 16% and simultaneously contracted transversely by 25% and heat set at 380° F. (193° C.) to form a fabric having 51 tie-points/cm², 7.5/cm LD and 6.8/cm TD. Examination of a cross-section of the thusly treated fabric under a microscope revealed that buckled nonwoven loops forming an upper outer fibrous layer protruded above a planar network of stitched yarns by about 1.0 mm, and under the yarn network by about 0.3 mm. The planar yarn network measured about 0.3 mm thick. The total fabric thickness was 1.6 mm before resin application.

Samples of the above-described fabric were then impregnated with resin R-2 to form Sample 1 and comparison Sample A, Sample 1 being impregnated with less resin than comparison Sample A (68 and 83% respectively, based on the total weight of the impregnated fabric). After resin impregnation, each sample had an overall thickness of 1.3 mm. There was no extra resin on the beyond the tips of the fibers or fiber loops. The absence of the extra resin was confirmed by light sanding with 320 grit sandpaper to expose the "first tips of fibers", a practice followed for all Examples.

Comparison Sample B was prepared from a 9-oz/yd² (305 g/m²) SONTARA® spunlaced sheet of ⅞-inch (2.2-cm) long, 1.35-den (1.5-dtex) polyester fibers (fabric type F-5) and resin impregnated the same way as Sample 1 and A. Comparison Sample C was prepared with a 4.8 oz/yd² (159 g/m²) commercial, brushed woven cotton fabric (type F-6) that was impregnated to about the same percentage resin content as Sample 1.

Table 1 below summarizes structural and performance characteristics of Sample 1 and the three comparison samples.

TABLE 1

| | Example I | | | |
|---|---|---|---|---|
| Sample identification | 1 | A | B | C |
| Fabric type | F-1 | F-1 | F-5 | F-6 |
| Area weight, g/m² | 150 | 150 | 306 | 163 |
| Thickness, mm | 1.6 | 1.6 | 2.3 | 0.7 |
| Density, g/cm³ | 0.09 | 0.09 | 0.13 | 0.23 |
| Impregnation depth | full | full | full | full |
| Resin identification | R-2 | R-2 | R-2 | R-2 |
| Composite sheet | | | | |
| Area weight, g/m² | 473 | 926 | 557 | 465 |
| Thickness, mm | 1.3 | 1.3 | 2.3 | 0.7 |
| Density, g/cm³ | 0.36 | 0.71 | 0.24 | 0.66 |
| % resin | 68 | 83 | 45 | 65 |
| % void | 70 | 41 | 80 | 45 |
| Planar yarn network | | | | |
| % of composite thickness | 23 | 23 | 0 | 55 |
| Tie points per cm² | 51 | 51 | 0 | 624 |
| Tie points LD per cm | 7.5 | 7.5 | 0 | 24 |
| Tie points TD per cm | 6.8 | 6.8 | 0 | 26 |

TABLE 1-continued

| | Example I | | | |
|---|---|---|---|---|
| Sample identification | 1 | A | B | C |
| Impregnated Outer Layer | | | | |
| Total thickness, mm | 1.0 | 1.0 | 2.3 | 0.7 |
| Impregnated depth, mm | 1.0 | 1.0 | 2.3 | 0.7 |
| Fiber concentration. $C_{eff}$, g/cm³ | 0.04 | 0.04 | 0.07 | na |
| Average density, g/cm³ | 0.33 | 0.68 | 0.24 | na |
| Parameter P, g/cm³ | 0.11 | 0.16 | 0.13 | na |
| Composite characteristics | | | | |
| % compressibility, % C | 23 | 4 | 4 | 7 |
| % compression recovery, % CR | 95 | 100 | 80 | 80 |
| Flexibility, cm/mm thickness | 3.8 | 6.7 | 6.4 | 12.6 |
| % stretchability, % S | 28 | 3 | 3 | 12 |
| % water retention | 140 | 30 | 60 | 50 |
| Tongue tear LD, Kg | 2.8 | 1.1 | 1.6 | 1.3 |
| Tongue tear TD, Kg | 5.1 | 3.3 | 1.9 | 1.2 |
| Tensile strength, LD, Kg | 27 | 33 | 60 | 28 |
| Tensile strength, TD, Kg | 18 | 22 | 24 | 40 |

Note: "na" means not applicable.

As shown by the data summarized in Table 1, the composite sheet of Sample 1 was relatively soft, pliable, absorbent, and strong and well suited for use as an artificial leather. In contrast, comparison Sample A, which had composite and outer fibrous layer densities greater than those required for composite sheet of the invention, had serious deficiencies in compressibility, flexibility tear resistance and water retention. Also, compared to Sample 1, both comparison Samples B and C also were inferior in compressibility, flexibility, water retention and tear resistance. Note that both of these comparison samples lacked required structural features of the invention, such as a suitable planar yarn network appropriately combined with a suitable outer fibrous layer.

EXAMPLE II

This examples illustrates the preparation of composite sheets of the invention (Samples 2 and 3) from fabrics that are formed from layers of fibers that were stitchbonded with elastic combination yarns (i.e., fabrics of type F-2), contracted and then resin treated. The effects of resin content and the particular resin used on the performance of the resultant composite sheets is shown with comparison Samples D and E. This example also includes for further comparison, Sample F, a resin-impregnated, napped elastic woven fabric of a commercial type (fabric type F-6) used in the manufacture of some artificial leather.

The fabric for Samples 2, 3, D and E was prepared from a 0.7-oz/yd² (24 g/m²) SONTARA® Style 8017 spunlaced sheet of 1.35-den (1.5 dtex) ⅞-inch (2.2-cm) long polyester fibers. The sheet was stitchbonded with a two-bar multi-needle machine. Each bar had 14 needles/inch TD (5.5/cm), inserted 29 stitches/inch (11.4/cm), and formed a 1-0,4-5/4-5,1-0 pattern of stitches with a combination yarn of 280-den (320-dtex) LYCRA® spandex loosely entangled with 70-den (78-dtex) textured polyester filaments. The as-stitched fabric had an area weight of 256 g/m², consisting of 24 g/m² of polyester staple fibers, 117 g/m² of polyester textured yarn and 115 g/m² of spandex filaments. The as-stitched fabric immersed in boiling water and then dried and heat treated on a tenter fame with the fabric undergoing a gather (contraction) of 20% LD and 73% TD. The contracted fabric had a unit weight of 536 g/m². As a result of the contraction, the spandex formed a planar network of yarns and the staple fiber layer buckled and the textured polyester filaments bulked to form a low density outer upper fibrous layer of about 1.6-mm thickness as well as a less thick, low density, outer lower fibrous layer. Inspection of the gathered fabric cross-section indicated that about one-half (by total weight) of the bulked yarn and substantially all of the staple fiber was in the upper outer layer.

The gathered fabric was impregnated with resin to form the composite sheets whose characteristics are listed in Table 2 below. Sample 2 was impregnated with resin solution R-2; Sample 3, with resin R-1; comparison Sample D, with resin R-1, but at a higher resin content than Sample 3; and Sample E, with resin R-5.

The commercial, napped, elastic fabric of Sample F was woven with inelastic cotton-staple-spun yarns in the warp and elastomeric yarns covered with staple cotton fibers in the weft. There were 22 yarns/cm LD and 26 yarns/cm TD, which provided the fabric with a total of 572 tie points/cm². The fabric was impregnated with resin R-2 to form a poromeric polyurethane structure within the composite sheet of Sample F.

The structural and performance characteristics of the samples of this example are summarized below in Table 2. The summarized data show that Samples 2 and 3 of the invention have desirable properties for use as artificial leather. In contrast, Sample D, which was made with the same fabric and same resin as Sample 3, but with a 68% versus 21% resin content, had a composite density and an outer layer density that were excessively high, and as a result, lacked the compressibility, flexibility, water retention and tear strength of Sample 3 of the invention.

Comparison Sample E was made with the same fabric as Samples 2 and 3 of the invention, but was impregnated with a very small amount of polyurethane resin R-5 (i.e., 12% of the total composite weight). Resin R-5 is not "elastomeric", as defined herein. As a result of use of resin R-5, the composite sheet of Sample E was undesirably incompressible, inflexible and of relatively low tear strength, especially when compared with the composite sheets of Samples 2 and 3.

Comparison Sample F which was made with the commercial napped, elastic, woven cotton fabric and coagulated poromeric polyurethane resin R-2, exhibited less compressibility, less flexibility, less tear resistance and less water retention than Samples 2 and 3 of the invention.

TABLE 2

| | Example II | | | | |
|---|---|---|---|---|---|
| Sample identification | 2 | 3 | D | E | F |
| Fabric type | F-2 | F-2 | F-2 | F-2 | F-7 |
| Area weight, g/m² | 536 | 536 | 536 | 536 | 329 |
| Thickness, mm | 2.4 | 2.4 | 2.4 | 2.4 | 1.4 |
| Density, g/cm³ | 0.22 | 0.22 | 0.22 | 0.22 | 0.24 |
| Impregnation depth | full | full | full | full | full |
| Resin identification | R-2 | R-1 | R-1 | R-5 | R-2 |
| Composite sheet | | | | | |
| Area weight, g/m² | 840 | 680 | 1660 | 610 | 564 |
| Thickness, mm | 2.4 | 2.4 | 2.4 | 2.4 | 1.4 |
| Density, g/cm³ | 0.35 | 0.28 | 0.69 | 0.25 | 0.40 |
| % resin | 36 | 21 | 68 | 12 | 42 |
| % void | 71 | 77 | 43 | 79 | 67 |
| Planar yarn network | | | | | |
| % of composite thickness | 17 | 17 | 17 | 17 | 50 |
| Tie points per cm² | 129 | 129 | 129 | 129 | 572 |

TABLE 2-continued

| | Example II | | | | |
|---|---|---|---|---|---|
| Sample identification | 2 | 3 | D | E | F |
| Tie points LD per cm | 13.6 | 13.6 | 13.6 | 13.6 | 22 |
| Tie points TD per cm | 9.5 | 9.5 | 9.5 | 9.5 | 26 |
| Impregnated Outer Layer | | | | | |
| Total thickness, mm | 1.6 | 1.6 | 1.6 | 1.6 | 1.4 |
| Impregnated depth, mm | 1.6 | 1.6 | 1.6 | 1.6 | 1.4 |
| Fiber conc., $C_{eff}$, g/cm³ | 0.11 | 0.11 | 0.11 | 0.11 | na |
| Average density, g/cm³ | 0.22 | 0.16 | 0.54 | 0.15 | na |
| Parameter P, g/cm³ | 0.14 | 0.12 | 0.22 | 0.13 | na |
| Composite characteristics | | | | | |
| % compressibility, % C | 25 | 25 | 8 | 0 | 7 |
| % compression recovery, % CR | 90 | 90 | 100 | na | 80 |
| Flexibility, cm/mm thickness | 3.4 | 4.8 | 7.1 | 18 | 6.5 |
| % stretchability, % S | 23 | 31 | 3 | 3 | 17 |
| % water retention | 170 | 250 | 85 | 240 | 95 |
| Tongue tear LD, Kg | 11 | 9 | 3.1 | 2.3 | 1.8 |
| Tongue tear TD, Kg | 6 | 6 | 2.2 | 2.1 | 1.8 |
| Tensile strength, LD, Kg | 24 | 19 | 33 | 43 | 43 |
| Tensile strength, TD, Kg | 32 | 46 | 52 | 58 | 24 |

EXAMPLE III

This example illustrates the preparation of composite sheets of the invention, each comprising a fabric whose outer fibrous layer is only partially impregnated with resin (Samples 5–8). These samples are compared to two composite sheets (Samples 4 and H) each comprising a fabric that is fully impregnated through its total thickness, Sample 4 being a composite sheet of the invention and Sample H being a comparison composite sheet outside the invention.

Composite sheet Samples 4–7 of the invention and comparison Sample H were each prepared with the same fabric, a two-bar, multi-needle stitched Style 8K00 SONTARA® spunlaced nonwoven sheet. The spunlaced sheet had an area weight of 0.7 oz/yd² (24 g/m²) and was composed 93% by weight of polyester fibers of ⅞-inch (2.2-cm) length and 1.35 denier (1.5 dtex) and 7% of KEVLAR® aramid fibers of ¾-inch (1.9-cm) length and 1.5 denier (1.7 dtex). The sheet was overfed by about 39% to the stitching machine. Each bar had 14 needles/inch TD (5.5/cm), and inserted 14 stitches/inch LD (5.5/cm). The front bar inserted a 1-0,3-4 pattern of stitches with textured, high-tenacity, 150-filament polyester yarns of 220 den (240 dtex). The back-bar inserted a 1-0,4-5 pattern of stitches with 280-den (320-dtex) elastic yarn of LYCRA® spandex loosely entangled with 70-den (78-dtex) textured polyester filaments. The as-stitched fabric had an area weight of 192 g/m², of which the fibers of the spunlaced sheet weighed 33 g/m², the high tenacity polyester yarn weighed 90 g/m², the spandex weighed 33 g/m², and the polyester yarn with which the spandex was entangled weighed 36 g/m². The as stitched fabric was immersed in boiling water, dried and tentered at 390° F. (199° C.) under conditions that permitted a shrinkage to about one-half of its as-stitched TD dimension and to about two-thirds of its as-stitched LD dimension, or to about one-third of its as-stitched area. The contracted fabric weighed 576 g/m². As a result of the construction and contraction of the stitched fabric, the spandex yarns formed a planar network which amounted to about 14% of the total thickness of the fabric and the buckled spunlaced staple fiber layer, the buckled polyester yarns and the bulked polyester entangled yarns contributed to the formation of the outer fibrous layers. The upper outer fibrous layer was 1.0-mm thick.

A non-elastic stitchbonded fabric (type F-1) was used in preparing the composite sheet of Sample 8 of the invention. The fabric was a two-bar, multi-needle stitched Style 8017 SONTARA® spunlaced nonwoven sheet. The spunlaced sheet, which had an area unit weight of 0.7 oz/yd$^2$ (24 g/m$^2$) and was composed of polyester fibers of ⅞-inch (2.2-cm) length and 1.35 denier (1.5 dtex), was overfed by about 56% to the two-bar stitching machine. Each bar had 18 needles/inch TD (7.1/cm), and inserted 14 stitches/inch LD (5.5/cm). The front bar inserted a 1-0,3-4 pattern of stitches with 34-filament partially oriented polyester yarns of 200 den (220 dtex). The back-bar inserted a 3-4,1-0 pattern of stitches with 34-filament 70-den (78-dtex) textured polyester yarn. The as-stitched fabric had an area weight of 135 g/m$^2$, of which the fibers of the spunlaced sheet weighed 37 g/m$^2$, the partially oriented polyester yarn weighed 27 g/m$^2$, and the textured polyester yarn weighed 71 g/m$^2$. The as stitched fabric was immersed in boiling water, dried and heat set on a tenter at 175° C. to effect a shrinkage to about one-half its as-stitched LD and TD dimensions, of to about one-fourth its as stitched area. The contracted fabric weighed 544 g/m$^2$. As a result of the construction and contraction of the stitched fabric, the partially oriented polyester yarns contracted and formed a planar network which occupied about one-fifth of the total thickness of the fabric and the buckled spunlaced staple fiber layer and the buckled textured polyester yarns formed outer fibrous layers. The upper outer fibrous layer was 0.6-mm thick and weighed 152 g/m$^2$; the lower outer fibrous layer, 0.5-mm and 42 g/m$^2$.

The fabrics of Sample 4 and comparison Sample H were fully impregnated with the two-part polyurethane resin R-1. The fabrics of Samples 5–8, were resin-treated to achieve only partial penetration of resin into the upper outer fibrous layer of the fabric. Samples 7 and 8 had a thin extra coating (about 0.1-mm thick) atop the partially resin-impregnated outer fibrous layer, which was removed before determining the layer characteristics. Resin R-1 was applied to the fabric of Sample 5 by, in sequence (a) smearing the resin onto a sheet of paper, (b) keeping the resin undisturbed on the sheet for 5 minutes, (c) pressing the sheet of paper onto the fabric with the resin in contact with the upper Outer fibrous layer of the fabric, (d) removing the paper sheet and (e) curing the resin for 8 hours at 160° F. (71° C.). For the fabric of Sample 6, a small amount resin R-4 solution was brushed onto the upper outer fibrous layer of the fabric and allowed to dry at 100° C. Resin R-3 was applied to the fabric of Sample 7 by the same method used for the fabric of Sample 5, except that after application to the paper, the resin was permitted to remain undisturbed for 20 minutes prior to transfer to the outer fibrous layer of the fabric.

TABLE 3

Example III

| Sample identification | 4 | 5 | 6 | 7* | 8* | H |
|---|---|---|---|---|---|---|
| Fabric type | F-2 | F-2 | F-2 | F-2 | F-1 | F-2 |
| Area weight, g/m$^2$ | 576 | 576 | 576 | 576 | 544 | 576 |
| Thickness, mm | 2.1 | 2.1 | 2.1 | 2.1 | 1.4 | 2.1 |
| Density, g/cm$^3$ | 0.27 | 0.27 | 0.27 | 0.27 | 0.39 | 0.27 |
| Impregnation depth | full | 0.25 | 0.25 | 0.30 | 0.30 | full |
| Resin identification | R-1 | R-1 | R-4 | R-3 | R-3 | R-1 |
| Composite sheet | | | | | | |
| Area weight, g/m$^2$ | 676 | 708 | 685 | 776 | 603 | 1629 |
| Thickness, mm | 2.1 | 2.1 | 2.1 | 2.1 | 1.4 | 2.1 |
| Density, g/cm$^3$ | 0.32 | 0.34 | 0.33 | 0.35 | 0.43 | 0.78 |
| % resin | 15 | 19 | 16 | 26 | 10 | 65 |
| % void | 73 | 72 | 73 | 70 | 64 | 35 |
| Planar yarn network | | | | | | |
| % of composite thickness | 14 | 14 | 14 | 14 | 21 | .14 |
| Tie points per cm$^2$ | 91 | 91 | 91 | 91 | 151 | 91 |
| Tie points LD per cm | 8.3 | 8.3 | 8.3 | 8.3 | 11 | 8.3 |
| Tie points TD per cm | 11 | 11 | 11 | 11 | 14 | 11 |
| Impregnated Outer Layer | | | | | | |
| Total thickness, mm | 1.0 | 1.0 | 1.0 | 1.0 | 0.6 | 1.0 |
| Impregnated depth, mm | 1.0 | 0.25 | 0.25 | 0.30 | 0.30 | 1.0 |
| Fiber conc., C$_{eff}$, g/cm$^3$ | 0.18 | 0.18 | 0.18 | 0.18 | 0.22 | 0.18 |
| Average density, g/cm$^3$ | 0.27 | 0.32 | 0.30 | 0.34 | 0.32 | 0.69 |
| Parameter P, g/cm$^3$ | 0.22 | 0.22 | 0.21 | 0.23 | 0.21 | 0.36 |
| Composite characteristics | | | | | | |
| % compressibility, % C | 15 | 19 | 19 | 18 | 15 | 3 |
| % recovery, % CR | 90 | 90 | 90 | 90 | 100 | 100 |
| Flex., cm/mm thickness | 3.3 | 2.8 | 2.2 | 2.1 | 3.7 | 9.3 |
| % stretchability, % S | 160 | 80 | 140 | 60 | 21 | 2 |
| % water retention | 290 | 320 | 350 | 280 | 280 | 20 |
| Tongue tear LD, Kg | 15 | 16 | 18 | 23 | 22 | 9 |
| Tongue tear TD, Kg | 9 | 14 | 18 | 25 | 24 | 12 |
| Tensile strength, LD, Kg | 91 | 103 | 101 | 118 | 51 | 74 |
| Tensile strength, TD, Kg | 20 | 32 | 27 | 28 | 43 | 24 |

*Note: These samples had a 0.1-mm thick top-coating.

Table 3 above summarizes various structural and performance characteristics of the composites of the invention Samples 4 through 8 and of comparison Sample H.

Comparison of Samples 4, 5 and H, which were made with the same fabric and the same resin, demonstrate that composite sheets perform differently because of the way resin was incorporated into the fabric. Samples 4 and H were fully impregnated with resin; in Sample 5 the resin penetrated only 25% of the outer fibrous layer. The resultant composite sheets of Sample 4 and 5 had a composite density and an impregnated outer layer average density and parameter P that were according to the present invention. Sample H was outside the invention; its composite density, layer density and layer parameter P were each greater than permitted by the invention. Compared to Sample H, the composite sheets of Samples 4 and 5 were much more compressible, more flexible and more able to retain water. Thus, whether the outer layer of a resin-treated fabric is fully or partially impregnated with resin, as long as the structural parameters of the sheet and resin are according to the invention, the composite sheet will be suitable material for use as artificial leather.

The composite sheets of Samples 5, 6, 7 and 8 of the invention were each prepared with fabrics that had outer fibrous layers that were only partially resin-impregnated to 25 to 50% of the layer thickness. Samples 7 and 8 had an additional 0.1-mm coating of the resin-resin impregnated layer. The top coating did not detrimentally affect performance of the composite sheets. Note that characteristics of the outer layer and the composite sheet, such as density, thickness, area weight, parameter P, etc. were determined with the extra top coating abrade from the surface oft he composite. Table 3 shows that each of Samples 5 through 8 were suited for use as artificial leather.

EXAMPLE IV

This example describes composite sheets of the invention, (Samples 9–12) prepared from resin-treated, contracted and bulked, knitted or woven fabrics. In these fabrics the outer fibrous layer was formed by the bulked yarns. Sample 9 and Sample 10 are each a contracted, two-bar knit fabric. Sample 9 is fully impregnated with resin; Sample 10 is only partially impregnated. Sample 11 is a fully impregnated, contracted, one-bar knit fabric. Sample 12 is a fully impregnated, contracted, woven fabric. Comparison Sample I, illustrates the undesirable stiffness that which results when the fabric is subjected to excessive contraction; the composite sheet becomes too inflexible for satisfactory use as artificial leather.

All the fabrics of this example were treated with elastomeric resin R-1. Characteristics of the composite samples are summarized below in Table 4. The following paragraphs provide further details.

The composite sheets of Samples 9 and 10 were produced with the same fabric. The fabric was knit on a two-bar machine, each bar being 10 gage, i.e., having 10 needles/inch TD (3.9/cm), and inserting 22 stitches/inch LD (8.7/cm). The front bar inserted a pattern of 2-3,1-0 stitches with a combination yarn of 280 den (320 dtex) LYCRA® spandex loosely entangled with textured 70-den (78-dtex) polyester yarn. The back bar inserted a pattern of 1-0,3-4 stitches with a 50-filament, 220-den (240-dtex) high tenacity textured polyester yarn. The as-stitched fabric weighed 76 g/m² which consisted of about 41 g/m² of high-tenacity polyester yarn, 17 g/m² of LyCRA® spandex and 18 g/m² of polyester textured yarns. The fabric was subjected to boiling water and heat treatment to contract the fabric to about 38% of its as-knit LD dimension and to two-thirds of its as-knit TD dimension, or to 27% of its as-knit area. The contraction was accompanied by gathering and big of the fabric. The contracted fabric weighed 274 g/m². Resin R-1 was applied to the fabric so that Sample 9 was fully impregnated and only 36% of the thickness of the upper outer fibrous layer of Sample 10 contained resin. Both composite sheet samples were suited for use as artificial leather.

The one-bar knit fabric of the composite of Sample 11 was prepared at 20 gage, with 7.9 needles/cm TD inserting 7.9 stitches/cm in a 1-0,2-3 stitch pattern with a combination yarn of 280 den (320 dtex) LYCRA® spandex loosely entangled with a textured 70-den (78-dtex) polyester yarn. The fabric was shrunk and heat-set so that LD and TD dimensions were each contracted to about one-half their as-knit dimension, or to an area of about one-fourth the as-knit area, thereby providing a fabric weighing about 200 g/m² and having 15.7 tie-points/cm LD and 11/cm TD. The contracted fabric had an upper and a lower outer fibrous layer, each of about 0.6-mm thickness. The outer layers were each formed by the bulked wrapping yarns of the combination yarn. The spandex of the combination yarn formed a planar network of yarns in the middle of the fabric. As shown in Table 4 below, the fully impregnated fabric of Sample 11 provided a composite sheet that was suitable for use as artificial leather.

To illustrate the undesirable effects of an excessive number of tie-points in planar yarn network of a fabric used to prepare a composite sheet similar to the composite sheet of the invention, comparison Sample I was prepared. The same one-bar knitting machine, number of needles/era TD, number of stitches/cm LD, knitting yarn, and repeating stitch pattern, as was used to prepare the fabric of Sample 11, was employed in making the fabric of comparison Sample Y. However, the as-knit fabric of Sample Y was contracted much more than the fabric of Sample 11. The fabric of comparison Sample Y was contracted to about 24% of its as-knit TD dimension and to about 40% of its as-knit LD dimension or to about 10% of its original area. As shown in Table 4, the tie-point frequency was increased to 32/cm TD and 19/cm LD and the tie-point concentration to 616/cm². Then, even though a relatively small amount of resin was used to impregnate the fabric (only 24% of the total weight of the composite), the resultant composite was still very stiff. Comparison Sample Y had a flexibility of 11.2 cm/mm in contrast to 3.1 cm/mm for Sample 11 of the invention.

Sample 12 of the invention that was prepared with a resin-impregnated, contracted woven fabric. The fabric was woven with 48 warps/in and 16 wefts/in (18.8/cm LD and 6.3/cm TD). Each warp consisted of two yarns, a 140-den (160-dtex) bare LYCRA® spandex and 34-filament, 150-den (167-dtex) textured, bulkable polyester yarn. Each weft yarn was a 150-den (167-dtex) polyester yarn. The as-woven fabric weighed 136 g/m², and consisted of 65 g/m² of polyester weft yarn, 14 g/m² of spandex, and 57 g/m² of textured, bulkable polyester warp yarn. The fabric was immersed in boiling water and then dried and heat set to yield a fabric that shrank to one-third of its as-woven TD dimension while maintaining its as-woven MD dimension. Table 4 shows that after resin treatment, Sample 12 was a suitable material for use as artificial leather.

TABLE 4

Example IV

| Sample identification | 9 | 10 | 11 | 12 | I |
|---|---|---|---|---|---|
| Fabric type | F-3 | F-3 | F-3 | F-4 | F-3 |
| Area weight, g/m² | 274 | 274 | 200 | 408 | 594 |
| Thickness, mm | 1.4 | 1.4 | 1.2 | 1.8 | 2.6 |
| Density, g/cm³ | 0.20 | 0.20 | 0.17 | 0.23 | 0.23 |
| Impregnation depth (mm) | Full | 0.25 | Full | Full | Full |
| Resin identification | R-1 | R-1 | R-1 | R-1 | R-1 |
| Composite sheet | | | | | |
| Area weight, g/m² | 333 | 335 | 354 | 685 | 784 |
| Thickness, mm | 1.4 | 1.4 | 1.2 | 1.8 | 2.6 |
| Density, g/cm³ | 0.24 | 0.24 | 0.30 | 0.38 | 0.30 |
| % resin | 18 | 18 | 43 | 40 | 24 |
| % void | 80 | 80 | 75 | 68 | 80 |
| Planar yarn network | | | | | |
| % of composite thickness | 14 | 14 | 17 | 33 | 15 |
| Tie points per cm² | 133 | 133 | 172 | 361 | 616 |
| Tie points LD per cm | 22.5 | 22.5 | 15.7 | 19 | 19 |
| Tie points TD per cm | 5.9 | 5.9 | 11 | 19 | 32 |
| Impregnated Outer Layer | | | | | |
| Total thickness, mm | 0.7 | 0.7 | 0.6 | 0.9 | 1.1 |
| Impregnated depth, mm | 0.7 | 0.25 | 0.6 | 0.9 | 1.1 |
| Fiber conc., $C_{eff}$ g/cm³ | 0.15 | 0.15 | 0.08 | 0.09 | 0.14 |
| Average density, g/cm³ | 0.19 | 0.24 | 0.21 | 0.25 | 0.21 |
| Parameter P, g/cm³ | 0.17 | 0.19 | 0.13 | 0.15 | 0.17 |
| Composite characteristics | | | | | |
| % compressibility, % C | 21 | 21 | 17 | 17 | 12 |
| % recovery, % CR | 90 | 90 | 90 | 90 | 85 |
| Flexibility, cm/mm thickness | 2.9 | 2.3 | 3.1 | 5.0 | 11.2 |
| % stretchability, % S | 80 | 80 | 74 | 60 | 9 |
| % water retention | 190 | 210 | 150 | 220 | 120 |
| Tongue tear LD, Kg | 5.0 | 8.5 | 4.5 | 23 | 2.7 |
| Tongue tear TD, Kg | 5.0 | 9.5 | 4.0 | 9.0 | 23 |
| Tensile strength, LD, Kg | 13 | 12 | 18 | 13 | 19 |
| Tensile strength, TD, Kg | 10 | 22 | 9 | 19 | 19 |

I claim:

1. An improved composite sheet comprising a fabric which is treated with an elastomeric resin, the composite sheet having a total thickness in the range of 0.5 to 3.0 millimeters, a unit weight in the range of 200 to 1000 g/m² and a void content in the range of 60 to 90%, the fabric having a longitudinal direction, a transverse direction, an upper outer layer, a lower outer layer and a stitched, knitted or woven planar network of yarns located between and parallel to the upper and lower outer layers, the planar network of yarns containing a multiplicity of tie points and having a thickness in the range of one-tenth to one-third of the total thickness of the fabric, and at least the upper or the lower outer layer having a thickness in the range of 0.5 to 2.0 mm, containing an elastomeric resin and comprising fibers of 0.5 to 5 decitex that are substantially separated from each other and form loops that pass back and forth through the planar network of yarns, the improvement comprising, in combination, the composite sheet having an over-all density of in the range of 0.2 to 0.45 g/cm³, the fabric having a tie point concentration in the range of 25 to 400 tie points per cm², with a tie point frequency of no more than 25 per cm in each of the longitudinal and transverse directions, the resin-containing outer layer having an effective fiber concentration in the range of 0.03 to 0.25 g/cm³, an average density in the range of 0.15 to 0.35 g/cm³ and a layer parameter P of no greater than 0.25 g/cm³, and the elastomeric resin being a polyurethane resin having a break elongation of at least 125%, a Shore A hardness of no greater than 70 and substantially immediate recovery to its original length after release from a stretch of 100%.

2. A composite sheet according to claim 1 wherein the tie point concentration is in the range of 50 to 250 per cm², the tie point frequency is in the range of 5 to 20 per cm and the resin comprises 20 to 45 weight percent of the composite sheet and at least partially impregnates the outer layer of the fabric.

3. A composite sheet according to claim 1 wherein the elastomeric resin impregnates the entire thickness of the fabric.

4. A composite sheet according to claim 1 wherein the composite sheet has a thin polymeric coating atop the outer layer containing the elastomeric resin.

5. A composite sheet according to any one of the preceding claims having a compressibility of 10 to 40% which is at least 80% recoverable, a bending length of no greater than 5.5 cm per mm of composite sheet thickness and a moisture retention in g/m² of at least 1.25 times the total area weight of the resin impregnated composite fabric.

6. A composite sheet according to claim 5 having a tongue tear strength of at least 2 Kg in each direction, a tensile strength of at least 5 Kg in each direction and a stretchability of at least 15% in at least the longitudinal or the transverse direction.

7. A composite sheet according to claim 5 wherein the yarns in at least one direction of the planar yarn network include spandex elastic yarns.

8. A composite sheet according to claim 5 wherein the yarns in at least one direction of the planar yarn network include yarns of partially molecularly oriented fibers of polyester or nylon.

9. A composite sheet according to claim 5 wherein at least 30 weight percent of the fibers in the upper or lower layer are cellulosic fibers.

\* \* \* \* \*